(12) United States Patent
Tamura et al.

(10) Patent No.: US 10,181,619 B2
(45) Date of Patent: Jan. 15, 2019

(54) METHOD OF MANUFACTURING NONAQUEOUS ELECTROLYTE SECONDARY BATTERY

(71) Applicant: AUTOMOTIVE ENERGY SUPPLY CORPORATION, Zama-shi, Kanagawa (JP)

(72) Inventors: Hidetoshi Tamura, Sagamihara (JP); Ippei Waki, Machida (JP); Tatsuji Numata, Kawasaki (JP); Hiroshi Yageta, Ebina (JP)

(73) Assignee: AUTOMOTIVE ENERGY SUPPLY CORPORATION, Zama-shi (JP)

( * ) Notice: Subject to any disclaimer, the term of this patent is extended or adjusted under 35 U.S.C. 154(b) by 247 days.

(21) Appl. No.: 14/496,506

(22) Filed: Sep. 25, 2014

(65) Prior Publication Data
US 2015/0089798 A1  Apr. 2, 2015

(30) Foreign Application Priority Data

Oct. 1, 2013 (JP) .................................. 2013-206067

(51) Int. Cl.
*H01M 10/058* (2010.01)
*H01M 4/139* (2010.01)
(Continued)

(52) U.S. Cl.
CPC ......... *H01M 10/058* (2013.01); *H01M 4/139* (2013.01); *H01M 10/049* (2013.01);
(Continued)

(58) Field of Classification Search
CPC ............. H01M 10/058; H01M 10/049; H01M 10/446; H01M 4/139
See application file for complete search history.

(56) References Cited

U.S. PATENT DOCUMENTS

| 5,932,632 A | 8/1999 | Biensan et al. |
| 6,048,372 A * | 4/2000 | Mangahara ............. H01M 4/04 29/623.5 |

(Continued)

FOREIGN PATENT DOCUMENTS

| JP | 07-254436 A | 10/1995 |
| JP | 09-283181 A | 10/1997 |

(Continued)

OTHER PUBLICATIONS

Machine translation of JP 2014-116233 A.*
(Continued)

*Primary Examiner* — Jonathan G Jelsma
(74) *Attorney, Agent, or Firm* — Foley & Lardner LLP

(57) ABSTRACT

An organic acid included in a nonaqueous electrolyte solution of a secondary battery is reduced. During preparation of a film-covered battery 1, the nonaqueous electrolyte solution is injected into an covering 5 of the film-covered battery 1 having an electrode including: the electrode active material, the binder, and the organic acid, the organic acid in the nonaqueous electrolyte solution is decomposed by electrical charging of a battery until a voltage level is equal to or above a decomposition voltage of the organic acid, and the gas that is produced by decomposition is degassed from the cut portion 6 of the covering 5.

12 Claims, 2 Drawing Sheets

(51) Int. Cl.
*H01M 10/04* (2006.01)
*H01M 10/052* (2010.01)
*H01M 10/44* (2006.01)
*H01M 4/04* (2006.01)

(52) U.S. Cl.
CPC ....... *H01M 10/052* (2013.01); *H01M 10/446* (2013.01); *H01M 4/0447* (2013.01); *Y10T 29/49108* (2015.01)

(56) References Cited

U.S. PATENT DOCUMENTS

| | | | | |
|---|---|---|---|---|
| 2006/0204850 | A1* | 9/2006 | Ham | H01M 4/131 429/231.3 |
| 2010/0313410 | A1* | 12/2010 | Min | H01M 10/0567 29/623.2 |
| 2013/0101899 | A1* | 4/2013 | Kajita | H01M 4/131 429/220 |
| 2014/0315072 | A1* | 10/2014 | Kobayashi | H01M 2/0217 429/156 |
| 2015/0229002 | A1* | 8/2015 | Kawasoe | H01M 10/052 429/188 |

FOREIGN PATENT DOCUMENTS

| | | | | |
|---|---|---|---|---|
| JP | 10-74521 | A | 3/1998 | |
| JP | 10-334888 | A | 12/1998 | |
| JP | 2002-246013 | A | 8/2002 | |
| JP | 2004-006188 | A | 1/2004 | |
| JP | 2008-262895 | A | 10/2008 | |
| JP | WO 2011162090 | A1 * | 12/2011 | ............ H01M 4/131 |
| JP | WO 2013065187 | A1 * | 5/2013 | .......... H01M 2/0217 |
| JP | WO 2014038174 | A1 * | 3/2014 | .......... H01M 10/052 |
| JP | 2014116233 | A * | 6/2014 | .......... H01M 10/052 |

OTHER PUBLICATIONS

Machine translation of JP 2002246013.*
Korean Office Action and English translation, dated Jan. 26, 2017, 6 pages.
Japanese Office Action issued in corresponding Japanese Patent Application No. 2013-206067 dated May 23, 2017 and its English machine translation thereof.

* cited by examiner

METHOD OF MANUFACTURING NONAQUEOUS ELECTROLYTE SECONDARY BATTERY

TECHNICAL FIELD

The present description relates to a method of manufacturing a nonaqueous electrolyte secondary battery.

BACKGROUND ART

It is known that at the time a positive electrode active material layer is formed by coating and drying a slurry (hereinafter, referred to as "positive electrode slurry") containing a solution prepared by dispersing a positive electrode material and a binder in an organic solvent, and kneading and mixing the solution thereof, an organic acid is added to the organic solvent to prevent gelation during the preparation of the positive electrode slurry (see, Patent Literature 1).

SUMMARY OF INVENTION

Technical Problem

It has been determined that an organic acid may elute from a positive electrode active material layer into a nonaqueous electrolyte solution during configuration of a secondary battery that combines the nonaqueous solution or the like with a positive electrode sheet including the positive electrode active material layer obtained by application of a positive electrode slurry containing an organic acid. Organic acid typically receives electrochemical oxidation-reduction reaction more easily than a solvent of the nonaqueous electrolyte solution, and thus a reduction in charge/discharge efficiency of the secondary battery may result from the oxidation-reduction reaction. In addition, the abovementioned elution in the positive electrode sheet also applies to a negative electrode sheet containing the organic acid.

Based on the above, an aim of the present description is to reduce the organic acid eluted from an electrode of the secondary battery into the nonaqueous solution.

Solution to Problem

A method of manufacturing a nonaqueous electrolyte secondary battery of the present description includes storing a power generating element having an electrode containing an electrode active material, a binder and an organic acid inside an covering, injecting the nonaqueous electrolyte solution into the power generating element, electrical charging of the power generating element until a voltage level is equal to or above a decomposition voltage of the organic acid in the nonaqueous electrolyte solution, and degassing a gas that is produced by decomposition in the nonaqueous electrolyte solution to out of the covering. According to the present disclosure, even in cases where the organic acid included in an original electrode is eluted into the nonaqueous electrolyte solution, the organic acid is decomposed and eliminated during the method of manufacturing of the nonaqueous electrolyte secondary battery.

Advantageous Effects of Invention

A method of manufacturing a nonaqueous electrolyte secondary battery of the present description includes storing a power generating element having an electrode containing an electrode active material, a binder and an organic acid, and a nonaqueous electrolyte solution inside an covering, injecting the nonaqueous electrolyte solution into the power generating element, electrical charging of the power generating element until a voltage level is equal to or above a decomposition voltage of the organic acid in the nonaqueous electrolyte solution, and a gas that is produced by decomposition in the nonaqueous electrolyte solution is degassed to out of the covering. According to the present disclosure, the organic acid included in the nonaqueous electrolyte solution in the method of manufacturing nonaqueous electrolyte secondary battery is reduced by decomposition and elimination, and thus the charge/discharge efficiency of the secondary battery is improved at a time of shipment.

DESCRIPTION OF EMBODIMENTS

Hereinafter, preferred embodiments of the present invention will be described.

Figure 1:
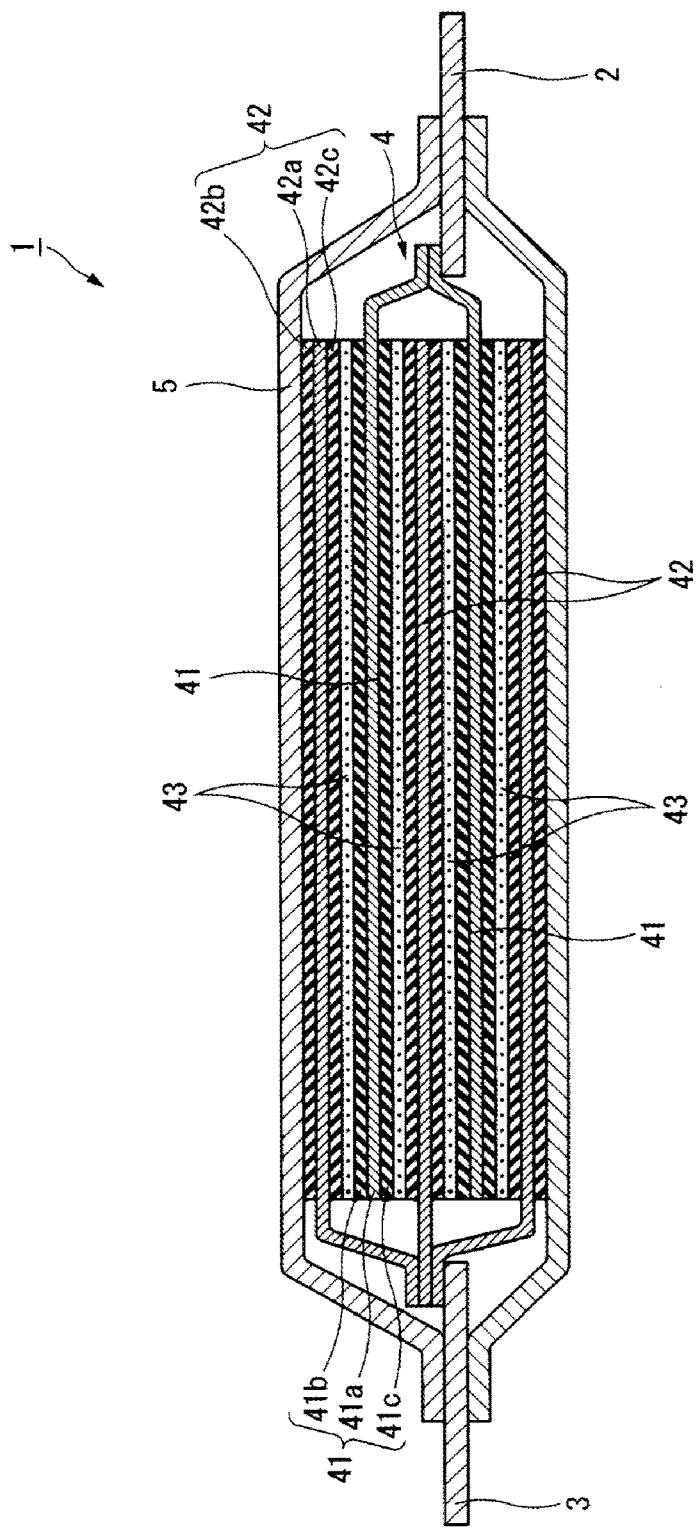
FIG. 1 shows a cross-sectional view of a first embodiment of a nonaqueous electrolyte secondary battery of a present description.

A film-covered battery 1 of a present embodiment, as indicated in FIG. 1, is a nonaqueous electrolyte secondary battery including a nonaqueous electrolyte solution injected into a power generating element having an electrode active material layer containing an electrode active material, a binder, and an organic acid.

Figure 2:
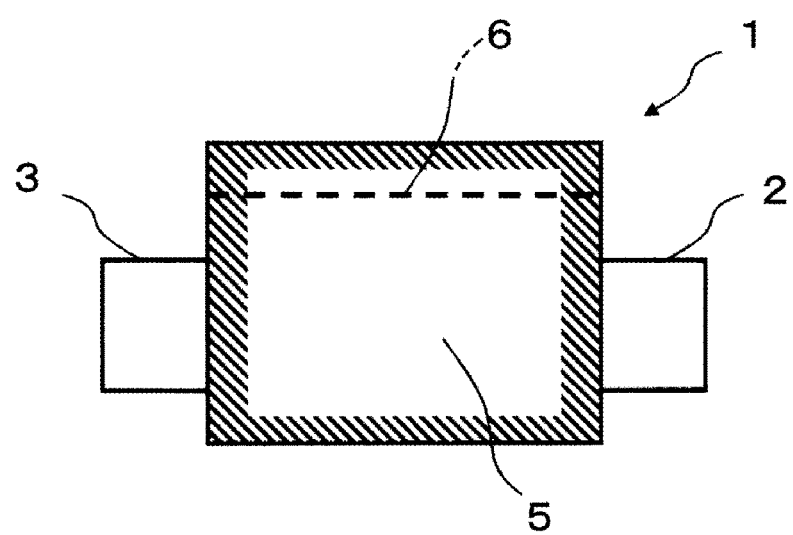
FIG. 2 shows a plan view of a cut portion of an covering of the nonaqueous electrolyte secondary battery of the present description.

The film-covered battery 1 is a lithium ion secondary battery, or the like, which has a flat rectangular outer appearance, as shown in FIG. 2. The film-covered battery 1 is configured such that a rectangular-shaped power generating element 4 and the nonaqueous electrolyte solution are stored inside an covering 5 including a laminate film. In addition, a positive electrode terminal 2 including a conductive metal foil is disposed at one edge of the covering 5, and a negative electrode terminal 3 including the same metal foil is disposed at another edge opposing the one edge.

The power generating element 4 includes alternately laminated plurality of positive electrode plates 41 and negative electrode plates 42 separated by separator 43, e.g., three negative electrode plates 42, two positive electrode plates 41, and four separators 43 disposed therebetween. In the present example, the negative electrode plate 42 is positioned on both sides of the power generating element 4. The positive electrode plate 41 may also be positioned on an outermost layer of the power generating element 4.

The positive electrode plate 41 constitutes a positive electrode active material layer 41b, 41c on both sides of a rectangular-shaped positive electrode collector 41a. The positive electrode collector 41a is composed of an electrochemically stabilized metal foil, e.g., an aluminum foil, an aluminum alloy foil, a copper foil, or a nickel foil.

The positive electrode active material layer 41b, 41c is formed by coating, drying, and rolling a positive electrode slurry formed by kneading and mixing a positive electrode active material containing a lithium manganese complex oxide powder and/or a lithium nickel complex oxide powder, a binder exemplified by polyvinylidene difluoride (PVDF), an organic solvent exemplified by N-methyl-2-pyrrolidone, and an organic acid on a main surface of the positive electrode collector 41a. The lithium manganese complex oxide and/or lithium nickel complex oxide may be any known complex oxide used in the lithium ion secondary battery lithium (see, Patent Literature 1).

In addition to polyvinylidene fluoride, the binder may include vinylidenefluoride-hexafluoropropylene copolymer, vinylidenefluoride-tetrafluoroethylene copolymer, styrene-butadiene copolymer rubber, polytetrafluoroethylene, polypropylene, polyethylene, polyimide, and polyamide-imide.

It is preferable that the organic acid is electrochemically decomposed by an electrical charge of the power generating element or gasified by decarboxylation. Accordingly, almost all or all of a decomposition by-product of the organic acid may be removed to an exterior of the covering, and the decomposition by-product of the organic acid may be removed such that no residual decomposition by-product remains in the battery. A compound indicated by a chemical formula (where R represents an optional monovalent group and Y represents an optional divalent group) such as R—COOH or HOOC—Y—COOH may be exemplified as the organic acid.

In particular, it is preferable that the R and Y groups in the compound of the abovementioned chemical formula are each independently gasified by electrochemical decomposition or decarboxylation, as the organic acid. The R group may be exemplified by a carboxyl group, a methyl group, an ethyl group, a propyl group, and a butyl group. The Y group may be exemplified by a methylene group, an ethylene group, a propylene group, and a butylene group. The carboxyl group in these groups may be linked as a substituent group. In a case where the R group is a carboxyl group, i.e., oxalic acid (HOOC—COOH), the oxalic acid may be completely removed by degassing because oxalic acid is oxidatively decomposed by electrochemical decomposition until carbon dioxide gas is produced, and the decomposition by-product of the organic acid does not remain in the battery.

In cases where the binder used in the positive electrode is a polyvinylidenefluoride-type binder, e.g., polyvinylidenefluoride, vinylidenefluoride-hexafluoropropylene copolymer, and vinylidenefluoride-tetrafluoroethylene copolymer, it is desirable that an effect achieved from the organic acid is to prevent gelation of the positive electrode slurry including the polyvinylidenefluoride-type binder. With regard to an additive amount of the organic acid, while there is a trade-off relationship between a gelation prevention effect and a reduction in the previously mentioned battery charge/discharge efficiency resulting from the organic acid, the trade-off relationship may be solved by decomposition of the organic acid according to the present description and degas of the organic acid outside the covering. Accordingly, even more organic acid may be added and a more effective gelation prevention effect may be obtained.

The negative electrode plate 42 constitutes the negative electrode active material layer 42b, 42c disposed on both sides of the rectangular-shaped negative electrode collector 42a that has substantially the same measurements as the positive electrode collector 41a. The negative electrode collector 42a is composed of an electrochemically stabilized metal foil, e.g., a nickel foil, a copper foil, a stainless steel foil, or an iron foil.

The negative electrode active material layer 42b, 42c is formed by coating, drying and rolling a negative electrode slurry formed by mixing the negative electrode active material sealing or emitting a lithium ion of the positive electrode active material, e.g., an amorphous carbon, a non-graphitizable carbon, a graphitizable carbon, or a graphite, the binder, and the organic solvent exemplified by N-methyl-2-pyrrolidone on a main surface of the negative electrode collector 42a. An organic acid similar that used in the positive electrode slurry may also be added during preparation of the negative electrode slurry.

In cases where the binder used in the negative electrode is a polyvinylidenefluoride type binder, e.g., polyvinylidenefluoride, vinylidenefluoride-hexafluoropropylene copolymer, and vinylidenefluoride-tetrafluoroethylene copolymer, it is desirable that an effect achieved from the organic acid is further stabilization of the binder on the negative electrode collector. Specifically, a known organic acid may be exemplified, so long as such an organic acid aims to improve adhesion of the binder and the negative electrode. With regard to an additive amount of the organic acid, while there is a trade-off relationship between a binder stabilization effect and a reduction in the previously mentioned battery charge/discharge efficiency resulting from the organic acid, the trade-off relationship may be solved by decomposition of the organic acid and degas of the organic acid outside the covering as described in the present description. Accordingly, even more organic acid may be added and a more effective binder stabilization effect may be obtained.

A portion of an edge of a length-wise direction of the negative electrode collector 42a extends as an extension that lacks the negative electrode active material layer 42b, 42c, as shown in FIG. 1. The tip of the negative electrode collector 42a is connected to a negative electrode terminal 3. Similarly, a portion of an edge of a length-wise direction of the positive electrode collector 41a extends as an extension that lacks the positive electrode active material layer 41b, 41c. The tip of the positive electrode collector 41a is connected to a positive electrode terminal 2.

The negative electrode terminal 2 and the negative electrode terminal 3 protrude out to an exterior via a connecting surface of the laminate film during heat-sealing of the laminate film of the covering 5. In the Example of FIG. 2, while the positive electrode terminal 2 is disposed at a first edge and the negative electrode terminal 3 is disposed at a second edge, it is also possible that the positive electrode terminal 2 and the negative electrode terminal 3 may both be aligned and disposed on the same edge.

The separator 43 functions to prevent a short circuit between the positive electrode plate 41 and the negative electrode plate 42, while simultaneously storing electrolytes. The separator 43 is composed of a microporous membrane formed of a polyolefin or the like, e.g., polyethylene (PE) or polypropylene (PP). The polyolefin or the like monolayer is not particularly limited as the separator 43, and thus a three-layered configuration sandwiching a polypropylene membrane between two polyethylene membranes or a laminated polyolefin microporous membrane and an organic nonwoven fabric or the like, may be employed.

The nonaqueous electrolyte solution is not particularly limited, and thus any known nonaqueous electrolyte solution may be used that is typically employed in a lithium ion secondary battery, e.g., a nonaqueous electrolyte solution having a lithium salt dissolved in an organic solvent.

A known aprotic organic solvent may be employed as the organic solvent of the nonaqueous electrolyte solution. For example, ethylene carbonate, propylene carbonate, dimethylcarbonate, diethylcarbonate, ethylmethyl carbonate, dimethylsulfoxide, sulfolane, γ-butyrolactone, 1,2-dimethoxyethane, N,N-dimethylformamide, tetrahydrofuran, 1,3-dioxolane, 2-methyl tetrahydrofuran, and diethylether may be exemplified as the aprotic organic solvent. The above exemplified aprotic organic solvent may be employed alone or in combinations of one or more.

For example, $LiClO_4$, $LiBF_4$, $LiPF_6$, $LiAsF_6$, $LiAlCl_4$, and $Li(CF_3SO_2)_2N$ may be exemplified as the lithium salt of the nonaqueous electrolyte solution. The above exemplified lithium salt of the nonaqueous electrolyte solution may be employed alone or in combinations of one or more.

In the method of manufacturing of the film-covered battery 1, the nonaqueous electrolyte solution is injected into the covering 5 that includes the power generating element 4, and the organic acid is decomposed in the nonaqueous electrolyte solution as a result of an application of an electrical charge of the power generating element 4 until a voltage level is equal to or above a decomposition voltage of the organic acid. In addition, the gas that is produced by decomposition thereof is eliminated from the power generating element 4. As previously mentioned, the organic acid is eliminated from the nonaqueous electrolyte solution.

Hereinafter, an example of a specific method of manufacturing the film-covered battery 1 will be explained.

First, the negative electrode plate 42, the separator 43, the positive electrode plate 41, the separator 43, and the negative electrode plate 42 are sequentially laminated, and the power generating element 4 is configured to attach to the positive electrode terminal 2 and the negative electrode terminal 3 by ultrasonic welding or the like. Then, the power generating element 4 is covered by the covering 5 and the openings of three edges of the covering are heat-sealed. Next, the nonaqueous electrolyte solution fills the inside of the power generating element 4 by injection into covering 5 through a non-heat-sealed opening of the edge. Thereafter, the covering 5 is tightly sealed by heat-sealing the non-heat-sealed opening of the edge.

Second, an initial electrical charge is adjusted up to a predetermined voltage level with respect to the power generating element 4. The organic acid included in the nonaqueous electrolyte solution is gasified by electrical charging. For example, in a case where the organic acid is oxalic acid, oxidative decomposition proceeds until carbon dioxide is produced. Next, as shown in FIG. 2, the covering 5 is cut at a boundary of a cut portion 6 along one edge of the covering 5, from which the positive electrode terminal and the negative electrode terminal 3 are not led out. The gas that is produced is degassed from the covering 5 via an opening of the cut portion 6. So long as the opening of the cut portion 6 is re-heat-sealed after degassing, the film-covered battery 1 that has the power generating element 4 tightly sealed inside the covering 5 will be complete. The opening of the cut portion 6 may be heat-sealed as is by depressurizing an ambient environment of the covering 5. It is preferable that the method employs a vacuum sealing device.

Described in further detail, an oxalic acid may be eluted into a nonaqueous electrolyte solution in cases where employing the oxalic acid $((COOH)_2)$ as the organic acid at the time of preparation of the slurry of the positive electrode active material layer 41b, 41c. A standard oxidation-reduction potential of a standard hydrogen electrode of oxalic acid is −0.475 V. On the other hand, the standard electrode potential of $LiMn_2O_4$ positive electrode active material is 1.00 V, and the standard electrode potential of $LiNiO_2$ positive electrode active material is 0.80 V. Accordingly, the oxalic acid included in the nonaqueous electrolyte solution is oxidatively decomposed until carbon dioxide is produced, so long as the abovementioned initial electrical charge voltage level is present. The carbon dioxide that is produced primarily accumulates in the covering 5.

Next, the covering 5 is cut as previously mentioned, the carbon dioxide is degassed from the opening of the cut portion 6 of the covering 5, and the covering 5 is tightly sealed by re-heat-sealing the opening of the cut portion 6, to thereby complete the film-covered battery 1.

The gas that is produced in the covering 5 as a result of depressurization of the ambient environment of the covering 5 by a vacuum sealing device, such as previously described, at the time that the cut portion 6 is formed, is immediately degassed, and the cut portion 6 is heat-sealed as is.

Although the covering 5 is tightly sealed at the time of electrical charging in the above example, the gas that is produced may be degassed to an exterior of the covering during electrical charging by performing electrical charging without sealing the injection solution opening after injection of the injection solution or by creating an opening in the temporarily sealed up covering 5 before electrical charging. Even in the above cases, sealing of the opening of the cut portion 6 may be accomplished by heat-sealing the covering 5 under lower pressure using a vacuum chamber including a heat-sealing mechanism.

Because the organic acid included in the nonaqueous electrolyte solution may be eliminated according to a method of manufacturing the film-covered battery 1, such as that described above, a lithium ion secondary battery having enhanced charge/discharge efficiency at the time of shipment may be obtained.

EXAMPLES

Hereinafter, examples of the present invention will be described.

Example 1

A positive electrode slurry was obtained by measuring $LiMn_2O_4$ as the positive electrode active material A, oxalic acid as the organic acid B, and polyvinylidenefluoride as the binder C at a weight ratio of A:B:C=95.9:0.1:4, and A, B, and C were mixed with N-methyl-pyrrolidone as the organic solvent. Next, a positive electrode formed by coating and drying the above positive electrode slurry, such that the positive electrode has a 20 μm positive electrode membrane thickness. The positive electrode was stored in the covering including: a negative electrode, a separator, and a laminate film. The nonaqueous electrolyte solution was injected into the covering. Two batteries were prepared by the above-described method. A first battery among two batteries was electrically charged to 4V and then degassed. As a specific degassing method, a cut portion 6 was formed in the covering 5 as shown in FIG. 2, a vacuum sealing device was used such that the surrounding area was in a reduced pressure environment, and an opening in the cut portion 6 was heat-sealed as it is. Then, the film-covered battery 1 was taken apart, and the positive electrode fragment was cut out. A residue in the binder was extracted while polyvinylidene-fluoride was completely dissolved by immersing the positive electrode fragment into N-methylpyrrolidene after washing with diethyl carbonate, and the amount of oxalic acid that was contained in the binder of the positive electrode was measured. The amount of oxalic acid included per unit weight of the positive electrode active material was one third of an initial included amount. On the other hand, a hole was created in a portion of the covering 5 of the battery 1 that was not electrically charged, a little amount of the nonaqueous electrolyte solution in the battery 1 was sampled through the hole, and the concentration of the oxalic acid in the sampled solution was measured. The dissolved amount of oxalic acid (total amount) calculated by multiplying the injection amount in the battery and the measured concentration value was two thirds of the total amount of the oxalic acid prepared in the positive electrode. As a result, two thirds of the total amount of the oxalic acid prepared in the positive electrode before electrical charging was eluted into the nonaqueous electrolyte solution. However, the oxalic acid was determined to be absent from the nonaqueous electrolyte solution in the battery after electrical charging and degassing.

Example 2

With the exception of forming the positive electrode by coating and drying the positive electrode slurry, such that the positive electrode had an 80 μm positive electrode membrane thickness, the two film-covered batteries of Example 2 were produced with the positive electrode active material, the organic acid, and the binder at a mixing ratio similar to that of Example 1. Degassing from one of the two batteries was performed after electrical charging until a voltage level similar to that of Example 1 was achieved. Next, the battery was taken apart by a method similar to that described in Example 1, a residue was extracted, and an amount of oxalic acid was determined. The amount of the oxalic acid was one half of the initial included amount. Even in the present example, there was no trace of the oxalic acid in the nonaqueous electrolyte solution in the battery after the degassing process. In a case where the dissolved amount of the oxalic acid in another electrolyte solution that was not electrically charged was also measured in a manner similar to that described in example 1, one half of the total initial amount of oxalic acid in the positive electrode was measured. As a result, one half of the total initial amount of the oxalic acid in the positive electrode before electrical charging was eluted into the nonaqueous electrolyte solution, and the oxalic acid was determined to be absent from the nonaqueous electrolyte solution after electrical charging and degassing.

Even in the batteries of Example 1 or 2, it is thought that the oxalic acid was eluted from the electrode into the nonaqueous electrolyte solution, the oxalic acid was oxidatively decomposed until carbon dioxide was produced by application of an electric charge thereafter, and the carbon dioxide gas was eliminated by degassing.

Moreover, as a result of the above, a solution has been suggested, in which the organic acid included in a nonaqueous electrolyte solution is oxidatively decomposed until carbon dioxide is produced and the organic acid is further eliminated to the covering in a battery manufacturing process, the disadvantages resulting from an oxidation-reduction reaction contributing to the oxidative decomposition of the organic acid in the process of electrical charging after shipment or an unwanted electrochemical reaction of a re-dissolved molecule at the electrode surface by a gas resulting from organic acid decomposition are eliminated, and a reduction in charge/discharge efficiency of a battery is canceled as a result of the reaction.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present description. Accordingly, the present description is not to be considered to be limited by the foregoing description and is only limited by the scope of the appended claims.

While a laminated lithium ion battery is specifically exemplified in the abovementioned embodiments, various modifications may be applied to the present description, e.g., a circular cylinder-shaped battery, a coin-shaped battery, card-shaped battery, a plate-shaped battery, an elliptic-shaped battery, a square-shaped battery, and a button-shaped battery.

Moreover, while the organic acid was added during preparation of the positive electrode slurry in the above examples, it is thought that the result would be the same as that obtained in Examples 1 and 2 even in case where the organic acid was added during the preparation of the negative electrode slurry.

REFERENCE SIGNS LIST

1 Film-covered battery (Nonaqueous electrolyte battery);
2 Positive electrode terminal;
3 Negative electrode terminal;
4 Power generating element;
5 Covering;
6 Cut portion;
41 Positive electrode plate;
42 Negative electrode plate; and
43 Separator.

CITATION LIST

Patent Literature

Patent Literature 1: JP-A H-10-74521.

The invention claimed is:

1. A method of manufacturing a nonaqueous electrolyte laminated secondary battery, comprising:
   storing a power generating element having a positive electrode containing an electrode active material, a binder, and an organic acid in a covering;
   injecting a nonaqueous electrolyte solution into the power generating element;
   electrical charging of the power generating element until a voltage level is equal to or above a decomposition voltage of the organic acid eluted from the positive electrode into the nonaqueous electrolyte solution, an amount of the organic acid eluted from the positive electrode into the nonaqueous electrolyte solution being from one half to two thirds of a total amount of the organic acid;
   degassing a gas that is produced by decomposition of the organic acid to out of the covering via an opening of a cut portion of the covering; and
   re-heat sealing the opening of the cut portion.

2. The method of manufacturing the nonaqueous electrolyte laminated secondary battery according to claim 1, wherein the organic acid included in the nonaqueous electrolyte solution is gasified by electrochemical decomposition resulting from the electrical charging of the power generating element.

3. The method of manufacturing the nonaqueous electrolyte laminated secondary battery according to claim 1, wherein the organic acid is represented by a chemical formula of R—COOH, where R represents a monovalent group.

4. The method of manufacturing the nonaqueous electrolyte laminated secondary battery according to claim 3, wherein the monovalent group comprises a carboxyl group, a methyl group, an ethyl group, a propyl group, or a butyl group.

5. The method of manufacturing the nonaqueous electrolyte laminated secondary battery according to claim 1, wherein the organic acid is represented by a chemical formula of HOOC—Y—COOH, where Y represents a divalent group.

6. The method of manufacturing the nonaqueous electrolyte laminated secondary battery according to claim 5, wherein the divalent group comprises a methylene group, an ethylene group, a propylene group, or a butylene group.

7. The method of manufacturing the nonaqueous electrolyte laminated secondary battery according to claim 1, wherein the positive electrode further comprises a positive electrode collector composed of an electrochemically stabilized metal foil.

8. The method of manufacturing the nonaqueous electrolyte laminated secondary battery according to claim 7, wherein the electrochemically stabilized metal foil comprises an aluminum foil, an aluminum alloy foil, a copper foil, or a nickel foil.

9. The method of manufacturing the nonaqueous electrolyte laminated secondary battery according to claim 1, wherein the electrode active material comprises a lithium manganese complex oxide powder, a lithium nickel complex oxide powder, or a combination thereof.

10. The method of manufacturing the nonaqueous electrolyte laminated secondary battery according to claim 1, wherein the binder comprises polyvinylidene fluoride, vinylidenefluoride-hexafluoropropylene copolymer, vinylidenefluoride-tetrafluoroethylene copolymer, styrene-butadiene copolymer rubber, polytetrafluoroethylene, polypropylene, polyethylene, polyimide, or polyamide-imide.

11. The method of manufacturing the nonaqueous electrolyte laminated secondary battery according to claim 1, wherein the organic acid comprises oxalic acid.

12. A method of manufacturing a nonaqueous electrolyte laminated secondary battery, comprising:
    storing a power generating element having a positive electrode containing an electrode active material, a binder, and an organic acid in a covering;
    injecting a nonaqueous electrolyte solution into the power generating element;
    electrical charging of the power generating element until a voltage level is equal to or above a decomposition voltage of the organic acid eluted from the positive electrode into the nonaqueous electrolyte solution, an amount of the organic acid eluted from the positive electrode into the nonaqueous electrolyte solution being from one half to two thirds of a total amount of the organic acid; and
    degassing a gas that is produced by decomposition of the organic acid to out of the covering via an opening of a portion of the covering; and
    heat sealing the opening of the portion of the covering.

* * * * *